US007972678B2

(12) United States Patent
Martelli

(10) Patent No.: US 7,972,678 B2
(45) Date of Patent: Jul. 5, 2011

(54) MOLDED PRODUCTS WITH MATTE FINISH

(75) Inventor: Daniel M. Martelli, Bridgeport, CT (US)

(73) Assignee: PolyOne Corporation, Avon Lake, OH (US)

( * ) Notice: Subject to any disclaimer, the term of this patent is extended or adjusted under 35 U.S.C. 154(b) by 1485 days.

(21) Appl. No.: 10/677,713

(22) Filed: Oct. 2, 2003

(65) Prior Publication Data

US 2004/0071936 A1    Apr. 15, 2004

Related U.S. Application Data

(60) Provisional application No. 60/418,543, filed on Oct. 15, 2002.

(51) Int. Cl.
*B29C 49/00* (2006.01)
(52) U.S. Cl. ...................................................... 428/143
(58) Field of Classification Search .................. 428/141, 428/158
See application file for complete search history.

(56) References Cited

U.S. PATENT DOCUMENTS

| 4,370,368 | A | * | 1/1983 | Hirata et al. | ................. | 428/36.6 |
| 4,481,163 | A | * | 11/1984 | Ota et al. | ....................... | 264/513 |
| 5,384,173 | A | * | 1/1995 | Akao et al. | ................... | 428/35.7 |
| 6,214,424 | B1 | * | 4/2001 | Chubb et al. | ................. | 428/34.1 |
| 6,524,694 | B1 | | 2/2003 | Phillips | ......................... | 428/323 |

OTHER PUBLICATIONS

"PET Solutions" Advertisement Sheet, PolyOne Corporation (2001).

* cited by examiner

*Primary Examiner* — Alicia Chevalier
(74) *Attorney, Agent, or Firm* — John H. Hornickel

(57) ABSTRACT

A molded thermoplastic product is disclosed. The product has an outer surface with a matte finish. The matte finish is produced by the combination of an etched mold in which the product is molded to physically affect the outer surface and a colorant compounded in the thermoplastic to chemically affect the outer surface. The colorant provides a diffused translucency. The etching adds tactile texture. The product is made by blow-molding techniques. Containers such as shampoo bottles can benefit from such visual and tactile sensations for the purpose of creating a trade dress for a consumer product.

13 Claims, No Drawings

MOLDED PRODUCTS WITH MATTE FINISH

CLAIM OF PRIORITY

This application claims priority from U.S. Provisional Patent Application Ser. No. 60/418,543 and filed on Oct. 15, 2002.

FIELD OF THE INVENTION

This invention relates to a molded product having a matte finish and a method of making such product.

BACKGROUND OF THE INVENTION

Modern consumer products demand eye-catching attention. Producers of consumer products compete for available shelf space in retail businesses. The outer appearance of a product, including its shape, color, texture, and labeling is the first impression for a consumer. Producers undertake considerable efforts to display a desired appearance to attract the consumer to the product. Such outer appearance, over time and with exclusivity, achieves a form of intellectual property for the producer, called trade dress, which offers a visual differentiation for commodity products and another differentiation for unique products.

Thermoplastic resins are used for the production of consumer products. Ranging from the clear, plastic, large soft drink bottles to the miniature colored cosmetic vials, polyethylene terephthalate (PET or polyester) as a resin has been frequently used because of its low cost and ability to be compounded with colorants. Most importantly, PET can be formed into products by conventional blow-molding techniques.

Molded products made by the blow-molding techniques take the shape and outer texture according to the mold used.

SUMMARY OF THE INVENTION

What the art needs is a molded product that can be replicated in a shape and outer appearance that combines the visual and tactile sensations of a matte finish.

The present invention solves this problem by providing a durable means to produce a molded product with a matte finish.

One aspect of the present invention is a molded thermoplastic product having an outer surface with a matte finish, wherein the matte finish is produced by a combination of an etched mold in which the product is molded to physically affect the outer surface and a colorant compounded in the thermoplastic to chemically affect the outer surface.

"Matte finish" means a lusterless surface. In respect of transparent, semi-transparent, or translucent thermoplastic polymers, a matte finish provides a diffused translucent effect in a manner analogous to frosted or etched surfaces on glass.

In the packaging business, there is a move away from glass containers toward plastic containers to reduce personal injury and property damage caused by breaking glass. Therefore there is a need in art for outer surfaces of a thermoplastic container to have an appearance similar to a frosted or etched glass appearance. The present invention fills that need in a manner that achieves essential durability of the production of the molded containers to satisfy demanding conditions of quality control for consumer packaging.

Another aspect of the present invention is a method of making the molded thermoplastic product described above, comprising the steps of (a) etching a mold in a manner to provide a physical texture; (b) compounding a colorant into a thermoplastic resin; and (c) blow-molding the thermoplastic resin in the etched mold.

A feature of the present invention is the generation of a matte finish on a blow-molded thermoplastic product using a combination of an etched mold and a chemical colorant where neither the mold nor the colorant alone achieves the same appearance.

Another feature of the present invention is the ability to provide differing matte finish appearances on the blow-molded thermoplastic product by using the both the mold and the colorant effects in one area, in combination with the use of mold effect alone, the use of the colorant effect alone, or neither in other area(s). For example, a blow-molded PET container can have an etched/colorant effect on the lower half of the container and a colorant-alone effect on the upper half of the container. Creating an etched surface on the mold only in that area where the lower half of the container is to be formed makes that container.

An advantage of the present invention is the ability to customize matte finish appearance effects for trade dress protection of consumer packaging.

Another advantage of the present invention is the ability to replicate matte finish appearance effects with essentially the same quality control throughout a production run of a thermoplastic product, because the mold is physically etched in a controlled manner.

Other features and advantages will be explained in connection with the embodiments of the invention.

EMBODIMENTS OF THE INVENTION

Thermoplastic Resins

The thermoplastic product uses conventional thermoplastic resins having properties known to those skilled in the art. Desired properties include transparency, semi-transparency, and translucency. Non-limiting examples of thermoplastic resins include polyethylene terephthalate (PET); cyclohexanedimethanol-modified PET (PETG); styrene acrylonitrile copolymer (SAN); general purpose styrene (GPS); polycarbonate (PC); and combinations thereof.

Conventional formulations for compounding of these thermoplastic resins into blow-molded products are well known to those skilled in the art of blow molding.

Colorant

Colorant useful in the present invention are those which generate the look of frosted glass on the outer surface of the blow-molded thermoplastic product. A commercially available colorant to achieve this "frosted glass" effect via in-mold processing without additional procedures is Hanna FX Frost Colorant from PolyOne Corporation (www.polyone.com). The Hanna FX Frost Colorant is shipped in a pelletized form. The pellets can be added to the thermoplastic resin and other materials in the formulation via conventional feeding equipment. The equipment accurately feeds the materials in a manner to achieve a uniform or even effect of the frosted glass appearance throughout the thermoplastic product so molded.

The Hanna FX Frost Colorant does not cause an alteration of the mold surface or the surface gloss on the molded part. Rather, the frosted glass appearance is a function of the chemistry of this additive in the thermoplastic compound.

The Hanna FX Frost Colorant is available to make an uncolored frosted-glass effect, called Frost Natural. Custom colors can be formulated in a range of hues for a colored frost look. A satin or sparkle frost effect also is available. These Hanna FX Frost colorants are formulated to be compatible with all transparent polymers.

The amount of colorant to be added to the thermoplastic resin can range from about 0.01 to about 15 parts by weight, and preferably from about 0.2 to 5 parts by weight. Additional information about the colorant and the thermoplastic resins is found in U.S. patent application Ser. Nos. 08/876,003 (Phillips) and 09/480,955 (Phillips), the disclosures of which are incorporated by reference herein, the latter of which issued as U.S. Pat. No. 6,524,694 (Phillips), and in PCT Patent Publication WO 98/56850 (Hanna).

The translucent optical effects imparted by the compositions and methods of the invention are achieved by mixing very small quantities of light-diffusing particles, having an average maximum particle size of about 0.1 to about 200 microns, preferably about 1 to about 100 microns, with a transparent thermoplastic polymer prior to molding or extruding the mixture. Preferably, the particles are selected on the basis of their ability to reflect and transmit light diffusely, rather than rectilinearly or specularly, and the translucent visual effect more closely resembles a matte finished molded or spray-coated product. Thus, for example, light-diffusing materials, such as non-shiny mica particles used for laser marking, are preferred over light reflecting (specular) materials, such as mica pearls. However, mica pearls may also be employed to achieve a frosted effect with a more "satin" appearance.

To achieve the desired frosted effect, the light-diffusing particles may be in any form, such as powders, fibers, whiskers, platelets, flakes, aggregates, agglomerates or mixtures of these. Suitable particles include, but are not limited to, naturally occurring calcium carbonates, including reagent-grade calcium carbonate, ground chalk, ground limestone, ground marble and ground dolomite; ground or fiber calcium sulfates; silicates, such as glass fibers, glass flakes, solid and hollow glass spheres, aluminum silicate, synthetic calcium silicate and zirconium silicate; talc; kaolin; mica flakes, platelets and pearls; natural silicas, such as sand, quartz, quartzite, perlite, tripoli and diatomaceous earth; fumed silicas; titanates, such as barium titanate; sulfates, such as barium sulfate; sulfides, such as zinc sulfide and molybdenum sulfide; metallic oxides, such as aluminum oxide, zinc oxide, beryllium oxide, magnesium oxide, zirconium oxide, antimony oxide, titanium dioxide and aluminum hydroxide; aluminum diboride flakes; inorganic fibers, such as wollastonite, basalt, boron, boron nitrides and ceramic; single crystal fibers (i.e. whiskers), such as those of alumina trihydrate; short fibers, such as those of aluminum silicate with aluminum and magnesium oxides and calcium sulfate hemihydrate; organic flatting agents, such as wood flour and starch; and mixtures of any of the foregoing. If the particulate material is boron nitride, it is preferably in the form of, for example, powders, aggregates, agglomerates, and the like, or mixtures of these.

A desired translucent optical effect ranging in a continuum from very smooth visual textured effects to very grainy visual textured effects may be achieved, depending on the particulate material or mixture of particulate materials selected and the quantity of the particulate employed. For example, a smooth visual translucency is obtained by using white powder particulates, such as barium sulfate, zinc sulfide or ultrafine ground chalk. Slightly grainy visual translucency is obtained by using transparent particulates, such as solid glass microspheres having a particle diameter of about 2 to about 100 microns (preferably about 4 to about 44 microns) or hollow glass microspheres having a particle diameter of about 10 to 100 microns (preferably about 65 to about 75 microns); whereas a slightly more grainy visual translucency is obtained by using ceramic fibers having a diameter of about 2 to about 12 microns, and lengths of about 45 microns to about 1.5 millimeters (mm). Grainy translucent visual effects are also obtained with additives such as lamellar kaolin having an aspect ratio of 10:1 (length:diameter). To obtain very grainy visual translucent effects, wollastonite having aspect ratios ranging from about 5:1 to 15:1, are employed, with the highest aspect ratios giving the grainiest effects. Very grainy translucent visual effects are also achieved by using whiskers, such as such as those of alumina trihydrate, and metal flakes or platelets, such as those of mica.

Exemplary suitable particles for use in the invention are Sachtleben Blanc Fixe Micro® 2278N (milled barium sulfate, approximately 3 microns, available from Whittaker, Clark & Daniels, Inc., South Plainfield, N.J. (manufacturer Sachtleben, Germany); Omyacarb® 4 (calcium carbonate, 3.5 micron median, 15 micron max, Omya Inc.); Talc 399 (talc (magnesium silicate), available from Whittaker, Clark & Daniels, Inc., South Plainfield, N.J. (manufacturer Specialty Mineral); Zeeospheres® W-610 (ceramic microspheres, mixture of particle sizes of approximately 2 to 45 microns, Zeelan Industries, St. Paul, Minn.); Silcron® G602 (fine particle silica, average particle size approximately 2.7 microns, SCM Pigments, Baltimore, Md.); NYAD G® Wollastocoate (wollastonite, aspect ratio 15:1, 100-325 mesh), NYAD® 400 wollastonite (aspect ratio 5:1), 400 Wollastocoate (aspect ratio 5:1, 400 mesh) (NYCO Minerals, Inc., Willsboro, N.Y.); hollow glass microspheres (glass bubbles, 3M Corporation); Acematt® TS 100 (silica flatting agent, average particle size approximately 2 to 10 microns, Degussa Corp., Ridgefield Park, N.J.); Iriodin®/Lazer Flair® LS 810 (mica-based additive, particle size approximately 2 to 28 microns, EM Industries, Hawthorne, N.Y.); Afflair® 110 Fine Satin (mica-based additive, E.M. Industries, Hawthorne, N.Y.); Polartherm® (PT110 (Advanced Ceramics Corporation, Cleveland, Ohio; boron nitride particulate material, exhibiting a particle size distribution as follows: 10% of particles 23.770 microns or smaller, 50% of particles 49.920 microns or smaller, and 90% of particles 73.710 microns or smaller); and Carborundum Carbotherm® AS0517 (Carborundum Corporation, Amherst, N.Y.; boron nitride particulate material, agglomerates: approximate particle size 30 microns).

Because the quantities of the particulates employed in the invention compositions and methods are extremely small, the particulates do not perform the traditional functions of fillers (e.g. reinforcers, extenders, opacifiers, plasticizers, etc.).

Mold Etching

Conventionally, a matte finish has been made using sandblasted or glass-bead-blasted molds. The present invention uses etched molds to reduce the possibility of metal fatigue in the mold during repeated uses, leading to an erosion of textured appearance on the molded part.

The texture of the outer surface of a blow-molded product is dependent on the selection of etching pattern or etching technique within the inner surface of the mold. Etching patterns combine artistry of final appearance with technology of generating the pattern. Such skills are known to those in the art.

Microreplication is one technique. Microreplication can be used in this invention to prepare the mold to have a microembossed pattern. Desired embossing topography can be formed in tools via any of a number of well-known techniques, selected depending in part upon the tool material and features of the desired topography. Illustrative techniques include etching (e.g., via chemical etching, mechanical etching, or other ablative means such as laser ablation or reactive ion etching, etc.), photolithography, stereolithography, micromachining, knurling (e.g., cutting knurling or acid enhanced knurling), scoring or cutting, etc.

Metal etching is a technique used in the semiconductor industry and has achieved a high degree of precision. Nonlimiting examples of such commercial sources of metal etching include Lam Research Corporation of Fremont, Calif. which uses plasma etching; Semitool Inc. of Kalispell, Mont. which uses chemical reagent etching involving an oxidation-reduction reaction; and MKS Instruments, Inc. of Andover, Mass. which uses chlorine to etch aluminum. A commercially proficient source of etched molds is Akron Metal Finish Company of Akron, Ohio, which uses chemicals to remove metal from the mold surface to form a distinct pattern that replicates a texture on the outer surface of the molded product.

Etching of the mold also determines the level of coarseness and depth of the resulting outer surface of the molded part. Etching produces depressions and lands, i.e., the unetched mold inner surface. The depth of the depressions can range from about 0.1 µm to about 100 µm, and preferably from about 0.5 µm to about 10 µm. The ratio of depressions to lands in surface area can range from about 1 to 90 percent and preferably from about 50 to 80 percent. While a grid of depressions forming lands is most common, other angles can be employed to provide a knurled surface, etc.

The "sidewalls" of depressions can be any shape desired, ranging from a constant radius of curvature to any polygonal shape of at least 2 surfaces. Nonlimiting examples of shapes of etching, in cross-section, include curved, rectangular, trapezoidal, triangular, bimodal, and the like.

The width of depressions in any pattern, or any combination of them, can vary as needed. For example, the width of depressions that define lands can be relatively uniform for the mold's surface or can be varied to achieve any aesthetic appearance.

Optionally, the mold can also be subjected to conventional sandblasting or glass-bead blasting in addition to the etching.

The mold can be made from metals suitable for etching, such as aluminum, titanium, and the like.

Blow Molding

Molding equipment can be used to make large production runs of the molded product or prototype samples. For example, an Aoki Stretch Blow Molding machine from Aoki Technical Laboratory, Inc. of Nagano, Japan and Aoki Laboratory America of Elk Grove Village, Ill. can be used to produce sample bottles for customer trials and other consumer marketing evaluations. Such sample bottles are preferable to color chips for customer evaluation.

Blow-molding techniques known to those skilled in the art can affect the visual and tactile sensations of the matte finish achieved according to the present invention. For example, without undue experimentation, one skilled in the art can achieve variations in matte finish appearance by alterations in such parameters as pre-forming, gauge or other thickness measurement, and the like.

Conventional blow-molding techniques known to those skilled in the art can be used in the present invention, once the combination of an etched mold and a colorant are employed in the preparation for production.

Usefulness of the Invention

As explained with reference to Hanna FX Colorants, consumer products suitable for the use of a matte finish include packaging, containers, cosmetics, housewares, toys, outdoor furniture, computer and printer housings, jewel boxes, vases, light fixtures, backlighting, signs, buttons, personal electronic products and other products, to the extent that such products are produced using blow-molding techniques.

A particularly preferred use of the products of the present invention is in the health and beauty aid (HBA) business where product container appearance is important for trade dress benefits to the producer of the health or beauty aid product.

The invention is not limited to the above embodiments. The claims follow.

What is claimed is:

1. A molded thermoplastic product comprising a thermoplastic resin molded to have an outer surface having a matte finish with an etched pattern having depressions ranging from about 0.1 µm to about 100 µm to add tactile texture and matte finish appearance to the thermoplastic product and a frost colorant present in the thermoplastic product ranging from about 0.01 to about 15 parts by weight of thermoplastic resin, wherein the frost colorant comprises light-diffusing particles to add diffused translucency to the thermoplastic product.

2. The product of claim 1, wherein the outer surface is located in one area of the product to provide a different matte finish appearance from the remainder of the product.

3. The product of claim 1, wherein the product is molded from a thermoplastic resin that is transparent, semi-transparent, or translucent.

4. The product of claim 3, wherein the thermoplastic resin is selected from the group consisting of polyethylene terephthalate (PET); cyclohexanedimethanol-modified PET (PETG); styrene acrylonitrile copolymer (SAN); general purpose styrene (GPS); polycarbonate (PC); and combinations thereof.

5. The product of claim 1, wherein the light-diffusing particles are present in the thermoplastic product ranging from about 0.2 to about 5 parts by weight of thermoplastic resin and comprises any form of powders, fibers, whiskers, platelets, flakes, aggregates, agglomerates or mixtures of these.

6. The product of claim 1, wherein the etched pattern has depressions ranging from about 0.5 µm to about 10 µm.

7. The product of claim 6, wherein etched pattern has a surface area comprised of lands and depressions and wherein the ratio of depressions to lands in the surface area can range from about 1 to about 90 percent.

8. The product of claim 7, wherein the ratio of depressions to lands in the surface area can range from about 50 to about 80 percent.

9. The product of claim 1, wherein the product is in a useful form selected from the group consisting of packaging, containers, cosmetics, housewares, toys, outdoor furniture, computer and printer housings, jewel boxes, vases, light fixtures, backlighting, signs, buttons, and personal electronic products.

10. The product of claim 1, wherein the light-diffusing particles have an average maximum particle size of about 0.1 to about 200 microns.

11. The product of claim 1, wherein the light-diffusing particles are selected from the group consisting of naturally occurring calcium carbonates, ground or fiber calcium sulfates; silicates; talc; kaolin; mica flakes, platelets and pearls; natural silicas; fumed silicas; titanates; barium sulfate; sulfides; metallic oxides; aluminum diboride flakes; inorganic fibers; single crystal fibers; short fibers; organic flatting agents; and mixtures of any of the foregoing.

12. The product of claim 11, wherein the light-diffusing particles are barium sulfate.

13. The product of claim 1, wherein the etched pattern is microreplicated.

* * * * *